United States Patent
Tagawa et al.

(10) Patent No.: US 9,043,064 B2
(45) Date of Patent: May 26, 2015

(54) HYBRID VEHICLE

(75) Inventors: Masaaki Tagawa, Hamamatsu (JP); Yoshiki Ito, Hamamatsu (JP); Yukihiro Hosoe, Hamamatsu (JP); Hitoshi Ohkuma, Hamamatsu (JP)

(73) Assignee: SUZUKI MOTOR CORPORATION, Hamamatsu-shi, Shizuoka (JP)

( * ) Notice: Subject to any disclaimer, the term of this patent is extended or adjusted under 35 U.S.C. 154(b) by 0 days.

(21) Appl. No.: 13/981,236

(22) PCT Filed: Jan. 31, 2011

(86) PCT No.: PCT/JP2011/051911
§ 371 (c)(1),
(2), (4) Date: Oct. 15, 2013

(87) PCT Pub. No.: WO2012/104963
PCT Pub. Date: Aug. 9, 2012

(65) Prior Publication Data
US 2014/0032025 A1     Jan. 30, 2014

(51) Int. Cl.
*B60W 20/00*     (2006.01)
*B60W 10/06*     (2006.01)
(Continued)

(52) U.S. Cl.
CPC .............. *B60W 20/10* (2013.01); *B60W 10/06* (2013.01); *B60W 10/26* (2013.01); *B60W 20/00* (2013.01); *B60W 20/106* (2013.01); *B60W 20/40* (2013.01);
(Continued)

(58) Field of Classification Search
CPC ..... B60W 10/06; B60W 10/26; B60W 20/00; B60W 20/106; B60W 20/40; B60W 2520/10; B60W 2710/105; B60W 2710/1061; B60W 2710/248; B60W 10/08; B60W 20/10; B60W 2600/00; Y02T 10/48; Y10S 903/93
USPC ............................................ 701/22
See application file for complete search history.

(56) References Cited

U.S. PATENT DOCUMENTS 7,836,987 B2    11/2010   Aoki
2002/0107618 A1*   8/2002   Deguchi et al. ................. 701/22
(Continued)

FOREIGN PATENT DOCUMENTS

JP     2006-347420 A     12/2006
JP     2010-70118 A     4/2010

OTHER PUBLICATIONS

Form PCT/ISA/210 International Search Report issued in PCT/JP2011/051911 with English translation, date of mailing Apr. 12, 2011 (3 pages).

*Primary Examiner* — Mary Cheung
*Assistant Examiner* — Yuen Wong
(74) *Attorney, Agent, or Firm* — Flynn, Thiel, Boutell & Tanis, P.C.

(57) ABSTRACT

In a hybrid vehicle, a controller includes a target drive power setting device which sets a target drive power requested for the running of the vehicle, a target drive power calculator which calculates target drive power from the target drive power set by the target drive power setting device and the vehicle speed detected by a vehicle speed detector, an output limiter which limits the amount of power obtained from an electricity storer based on the state of the electricity storer, and a transition prohibitor which prohibits the transition of an engine to a stopped state when the power consumed for the transition of the engine from an operational state to a stopped state exceeds a value obtained by subtracting the target drive power calculated by the target drive power setting device from the output limit value set by the output limiter.

2 Claims, 8 Drawing Sheets

POWER CONSUMED BY ENGINE FROM OPERATION STATE TO STOP STATE

(51) Int. Cl.
*B60W 10/26* (2006.01)
*B60W 10/08* (2006.01)

(52) U.S. Cl.
CPC ...... *B60W 2520/10* (2013.01); *B60W 2710/105* (2013.01); *B60W 2710/1061* (2013.01); *B60W 2710/248* (2013.01); *Y02T 10/48* (2013.01); *B60W 10/08* (2013.01); *B60W 2600/00* (2013.01); *Y10S 903/93* (2013.01)

(56) References Cited

U.S. PATENT DOCUMENTS

2006/0021809 A1\* 2/2006 Xu et al. ............... 180/65.2
2010/0071975 A1 3/2010 Aoki \* cited by examiner

ENGINE STOP PERMISSION VEHICLE SPEED SEARCH MAP

HYBRID VEHICLE

TECHNICAL FIELD

The present invention relates to a hybrid vehicle, and particularly, to a hybrid vehicle which includes an engine and a motor generator (motor) as power sources and controls the plurality of power sources in order to output target drive power.

BACKGROUND ART

As vehicles, there is known a so-called hybrid vehicle which includes an engine and a motor generator (motor) other than the engine as drive sources and improves fuel efficiency.

The hybrid vehicle outputs power generated from the engine and the motor generator to a drive shaft through a power transmitting mechanism.

PATENT LITERATURE

Japanese Unexamined Patent Application Publication No. 2007-131103

In a vehicle and a vehicle control method according to PTL 1, a vehicle speed threshold value used for prohibiting an intermittent operation of an engine is set based on a limit of an input of a battery as an electricity storing means. Then, when a detected vehicle speed is equal to or higher than the set vehicle speed threshold value, control is executed so that the intermittent operation of the engine is prohibited, and an input of power equal to or higher than the limit of the input of the battery is prevented when starting the engine, thereby suppressing degradation of the battery.

SUMMARY OF INVENTION

Technical Problem

Incidentally, in the hybrid vehicle of the related art, there is no consideration on the power transmitting and receiving operation when stopping the engine. Further, in PTL 1, when the speed of the vehicle becomes a certain speed or more, the motion energy of the engine and the motor generator (a first motor generator: MG1 and a second motor generator: MG2) when stopping the engine increases compared to a case where the engine is operated, and hence power is consumed to stop the engine. Accordingly, an excessively large amount of power is consumed when stopping the engine depending on the state of the battery as the electricity storing means, and hence a problem arises in that degradation of the battery is promoted.

For this reason, a control method may be considered which determines a vehicle speed for prohibiting the intermittent operation of the engine in response to the limit of the output of the battery. However, even in such a control method, when a regeneration operation is performed, even when the limit of the output of the battery is small, the power which is consumed by the first motor generator (MG1) may be regenerated by the second motor generator (MG2). For this reason, the engine may be stopped without placing a burden on the battery, and hence it is hard to mention that the performance is sufficiently exhibited. Accordingly, there still remains a need for improvement.

Therefore, it is an object of the invention to provide a hybrid vehicle that suppresses degradation of a battery without giving an adverse influence (overdischarge or the like) on the lifetime of the battery as an electricity storing means.

Solution to Problem

According to the invention, there is provided a hybrid vehicle which outputs power generated by an engine and a motor generator to a drive shaft through a power transmitting mechanism, the hybrid vehicle including: an electricity storing means which exchanges power with the motor generator; a vehicle speed detecting means which detects a vehicle speed; and a control means which includes a target drive power setting means that sets a target drive power requested for the running of a vehicle, a target drive power calculating means that calculates target drive power from the target drive power set by the target drive power setting means and the vehicle speed detected by the vehicle speed detecting means, an output limiting means that limits the amount of power obtained from the electricity storing means based on the state of the electricity storing means, and a transition prohibiting means that prohibits a transition of the engine to a stopped state when the power consumed by transition of the engine from an operational state to a stopped state exceeds a value obtained by subtracting the target drive power calculated by the target drive power setting means from the output limit value set by the output limiting means.

Advantageous Effects of Invention

The hybrid vehicle of the invention may suppress degradation of the battery without giving an adverse influence (overdischarge or the like) on the lifetime of the battery as the electricity storing means.

DESCRIPTION OF EMBODIMENTS

The invention realizes an object that suppresses degradation of a battery without giving an adverse influence (overdischarge or the like) on the lifetime of the battery as an electricity storing means by managing a transition of an engine from an operational state to a stopped state based on a battery state.

Embodiment

FIGS. 1 to 8 illustrate an embodiment of the invention.

Figure 1:
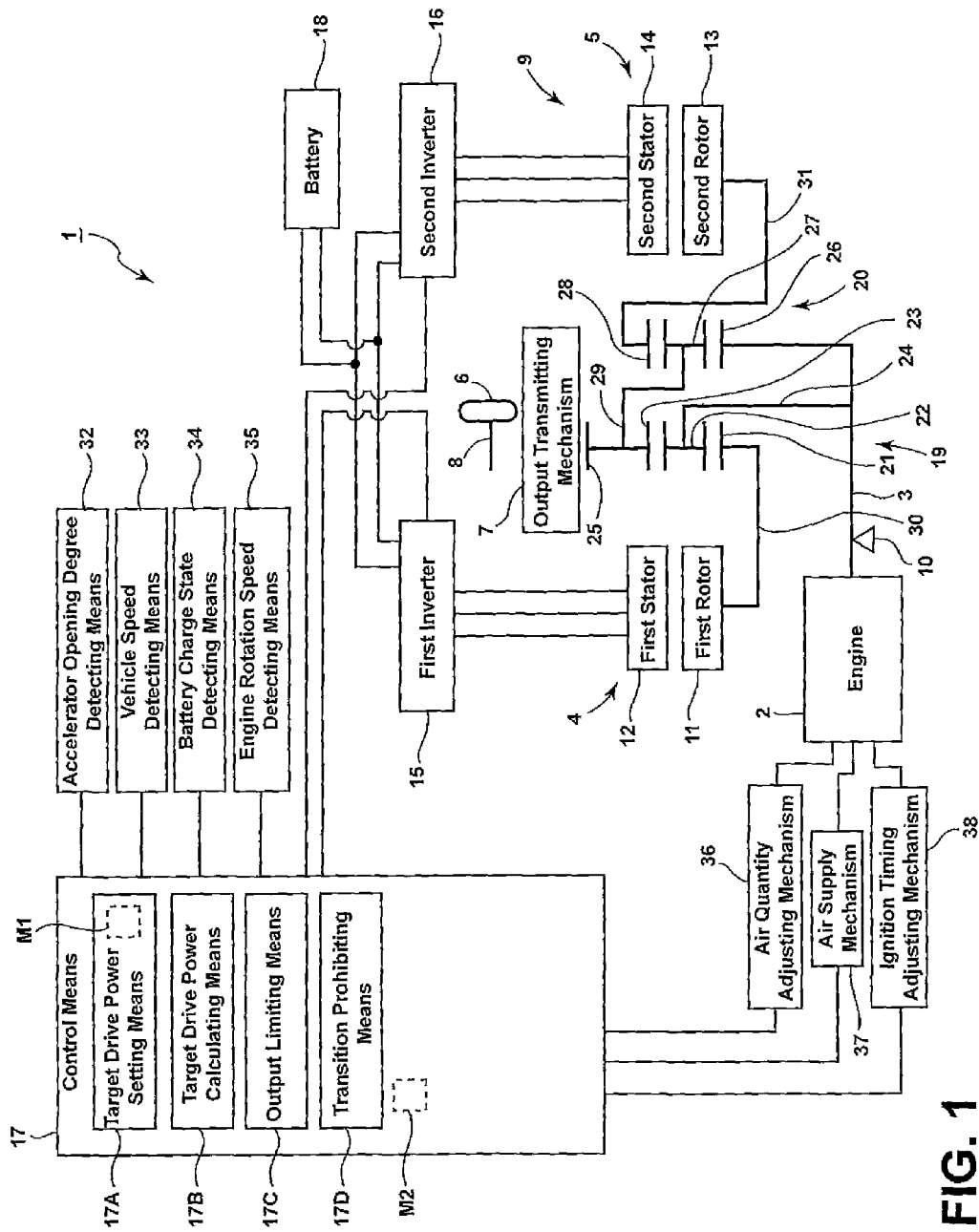
FIG. 1 is a system configuration diagram of a hybrid vehicle control device (embodiment).

In FIG. 1, a control device 1 of a hybrid vehicle as an electric vehicle is provided.

The control device 1 includes an output shaft 3 of an engine (in the drawings, "ENG") 2 as a drive source which outputs a torque, a first motor generator (in the drawings, "MG1") 4 and a second motor generator (in the drawings, "MG2") 5 as a plurality of motor generators (motors), a drive shaft (in the drawings, "OUT") 8 which is connected to a drive wheel 6 through an output transmitting mechanism 7, and a power transmitting mechanism (differential gear mechanism) 9 which is connected to each of the output shaft 3 of the engine 2, the first motor generator 4, the second motor generator 5, and the drive shaft 8. That is, in the hybrid vehicle according to the embodiment, the power which is generated from the engine 2, the first motor generator 4, and the second motor generator 5 is output to the drive shaft 8 as the output shaft of the power transmitting mechanism 9 through the power transmitting mechanism 9.

A one-way clutch 10 is provided in the middle of the output shaft 3 of the engine 2 so as to be close to the engine 2. The one-way clutch 10 prevents the reverse rotation of the engine 2, and receives the torque reaction force of the second motor generator 5 in the EV (electric vehicle) running mode.

The first motor generator 4 includes a first rotor 11 and a first stator 12. The second motor generator 5 includes a second rotor 13 and a second stator 14.

Further, the control device 1 includes a first inverter 15 which controls the operation of the first motor generator 4, a second inverter 16 which controls the operation of the second motor generator 5, and a control means (ECU) 17 which is connected to the first inverter 15 and the second inverter 16.

The first inverter 15 is connected to the first stator 12 of the first motor generator 4. The second inverter 16 is connected to the second stator 14 of the second motor generator 5.

The respective power supply terminals of the first inverter 15 and the second inverter 16 are connected to a battery (driving high-voltage battery) 18 as an electricity storing means. The battery 18 may exchange power with the first motor generator 4 and the second motor generator 5.

The power transmitting mechanism 9 is a so-called four-axis-type power input and output device, and has a configuration in which the output shaft 3 of the engine 2 and the drive shaft 8 are disposed, the first motor generator 4 near the engine 2 and the second motor generator 5 near the drive shaft 8 are disposed, the power of the engine 2, the power of the first motor generator 4, and the power of the second motor generator 5 are combined so as to be output to the drive shaft 8, and power is transmitted and received among the engine 2, the first motor generator 4, the second motor generator 5, and the drive shaft 8.

The power transmitting mechanism 9 has a configuration in which a first planetary gear mechanism 19 and a second planetary gear mechanism 20, having two rotational components connected to each other, are provided in parallel.

The first planetary gear mechanism 19 includes a first sun gear 21, a first pinion gear 22 which meshes with the first sun gear 21, a first ring gear 23 which meshes with the first pinion gear 22, a first carrier 24 which is connected to the first pinion gear 22, and an output gear 25 which is connected to the first ring gear 23.

The second planetary gear mechanism 20 includes a second sun gear 26, a second pinion gear 27 which meshes with the second sun gear 26, a second ring gear 28 which meshes with the second pinion gear 27, and a second carrier 29 which is connected to the second pinion gear 27.

In the power transmitting mechanism 9, the first carrier 24 of the first planetary gear mechanism 19 is connected to the output shaft 3 of the engine 2. Further, the second carrier 29 of the second planetary gear mechanism 20 is connected to the first ring gear 23 and the output gear 25 of the first planetary gear mechanism 19.

The first rotor 11 of the first motor generator 4 is connected to the first sun gear 21 through the first motor output shaft 30. The output shaft 3 of the engine 2 is connected to the first carrier 24 and the second sun gear 26. The drive shaft 8 is connected to the first ring gear 23 and the second carrier 29 through the output gear 25 and the output transmitting mechanism 7. The second rotor 13 of the second motor generator 5 is connected to the second ring gear 28 through the second motor output shaft 31.

The second motor generator 5 may be directly connected to the drive wheel 6 through the second motor output shaft 31, the second ring gear 28, the second carrier 29, the first ring gear 23, the output gear 25, the output transmitting mechanism 7, and the drive shaft 8, and has a performance capable of causing a vehicle to run only by the output thereof.

That is, in the power transmitting mechanism 9, the first carrier 24 of the first planetary gear mechanism 19 and the second sun gear 26 of the second planetary gear mechanism 20 are coupled to each other so as to be connected to the output shaft 3 of the engine 2, the first ring gear 23 of the first planetary gear mechanism 19 and the second carrier 29 of the second planetary gear mechanism 20 are coupled to each other so as to be connected to the drive shaft 8, the first motor generator 4 is connected to the first sun gear 21 of the first planetary gear mechanism 19, the second motor generator 5 is connected to the second ring gear 28 of the second planetary gear mechanism 20, and power is transmitted and received among the engine 2, the first motor generator 4, the second motor generator 5, and the drive shaft 8.

The control means 17 is connected with an accelerator opening degree detecting means 32 which detects an accelerator stepping amount as an accelerator opening degree, a vehicle speed detecting means 33 which detects a vehicle speed, a battery charge state detecting means 34 which detects the charge state (SOC) of the battery 18, and an engine rotation speed detecting means 35 which detects an engine rotation speed.

Further, the control means 17 is connected with an air quantity adjusting mechanism 36, an air supply mechanism 37, and an ignition timing adjusting mechanism 38 so as to control the engine 2.

The control means 17 includes a target drive power setting means 17A which sets a target drive power requested for the running of the vehicle, a target drive power calculating means 17B which calculates a target drive power from the target drive power set by the target drive power setting means 17A and the vehicle speed detected by the vehicle speed detecting means 33, an output limiting means 17C which limits the amount of power obtained from the battery 18 based on the state of the battery 18, and a transition prohibiting means 17D which prohibits the transition to the stopped state of the engine 2 when the power consumed for the transition of the engine 2 from the operational state to the stopped state exceeds a value (the output limit value—the target drive power) obtained by subtracting the target drive power calculated by the target drive power setting means 17B from the output limit value (see FIG. 8) set by the output limiting means 17C.

Figure 7:
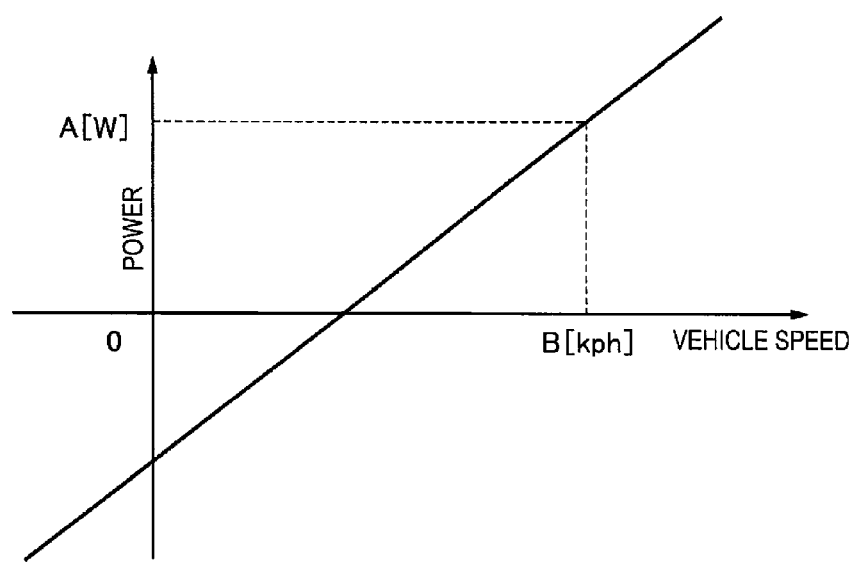
FIG. 7 is a diagram illustrating power that is consumed when the engine changes from an operational state to a stopped state (embodiment).

Further, the control means 17 sets the power which is consumed by the transition from the operational state of the engine 2 to the stopped state of the engine 2 and is used for the determination of the transition prohibiting means 17D so that a higher value is set as the vehicle speed detected by the vehicle speed detecting means 33 becomes higher as illustrated in FIG. 7.

Figure 3:
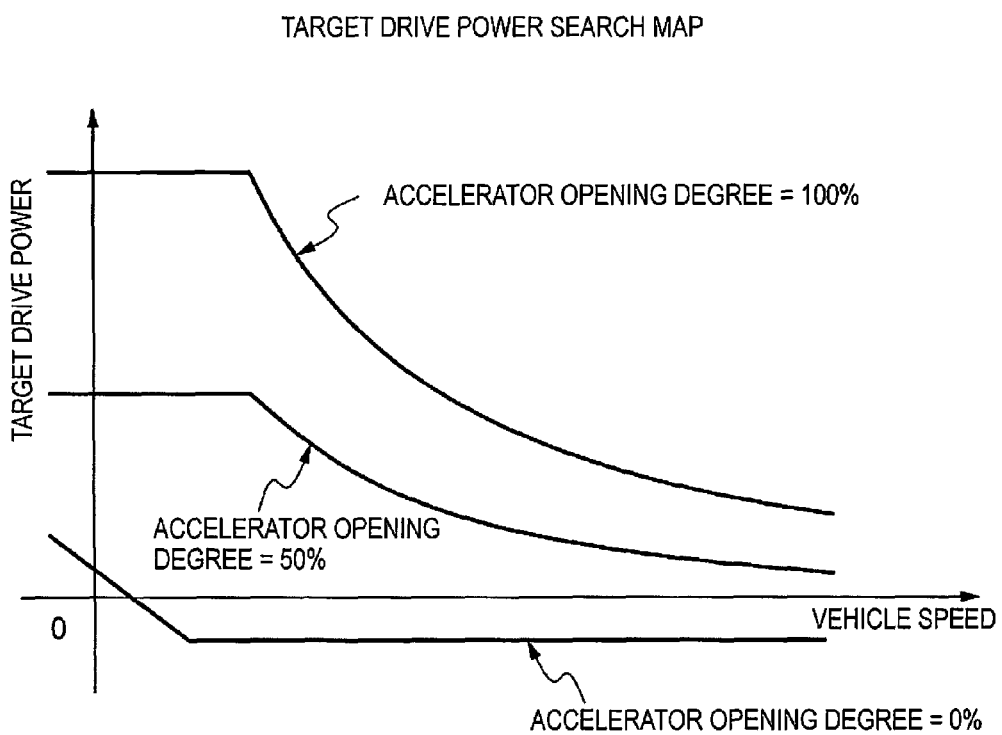
FIG. 3 is a diagram of a target drive power search map (embodiment).

For this reason, as illustrated in FIGS. 1 and 3, the control means 17 includes a target drive power search map M1 in the target drive power setting means 17A. In the target drive power search map M1, the target drive power is set in response to the vehicle speed.

Figure 4:
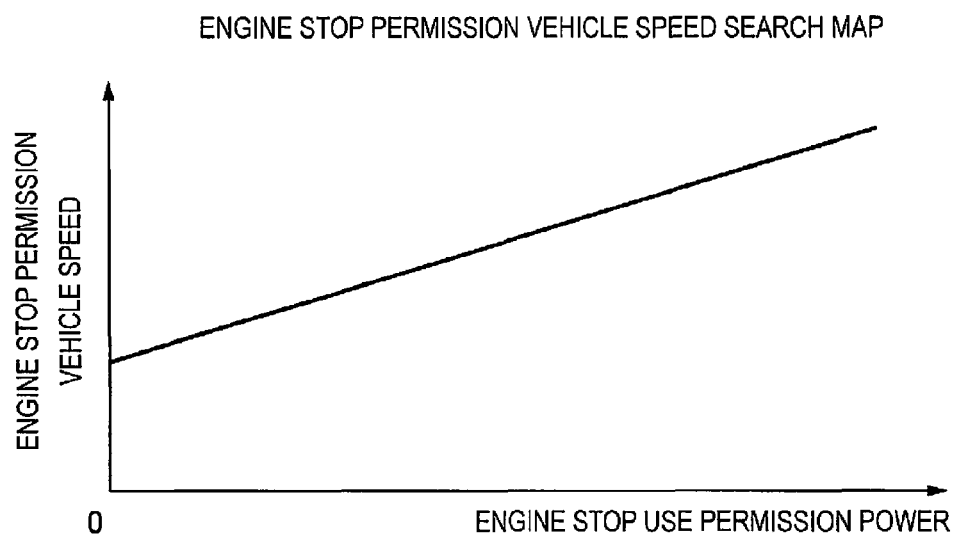
FIG. 4 is a diagram of an engine stop permission vehicle speed search map (embodiment).

Further, as illustrated in FIGS. 1 and 4, the control means 17 includes an engine stop permission vehicle speed search map M2. In the engine stop permission vehicle speed search map M2 of FIG. 4, the engine stop permission vehicle speed is determined in response to the engine stop use permission power. In this case, the target drive power is a value obtained by adding the engine stop use permission power to the output limit value. Further, the stopping of the engine may be determined by subtracting the target drive power from the output limit value.

The engine stop permission vehicle speed search map M2 illustrated in FIG. 4 is set as below.

Figure 5:
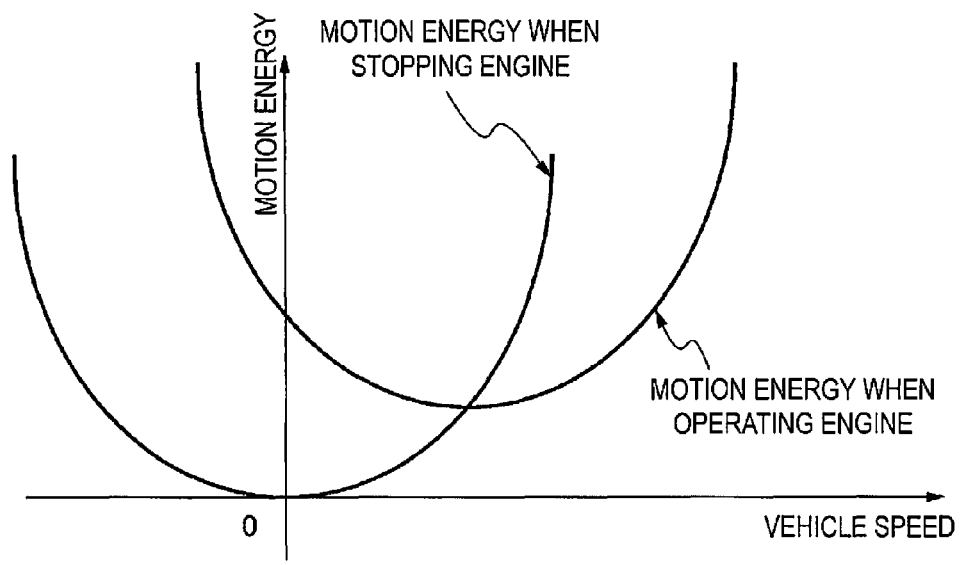
FIG. 5 is a diagram illustrating motion energy of an engine and a motor generator when operating and stopping the engine (embodiment).

First, FIG. 5 illustrates the motion energy of the engine and the motor generator when operating and stopping the engine 2. The motion energy is obtained from the following (Equation 1).

$$E = \tfrac{1}{2}\cdot Ie\cdot Ne^2 + \tfrac{1}{2}\cdot Img1\cdot Nmg1^2 + \tfrac{1}{2}\cdot Img2\cdot Nmg2^2 \quad \text{(Equation 1)}$$

In (Equation 1),
E: motion energy of engine and motor generator
Ie: inertia of engine
Ne: engine rotation speed
Img1: inertia of first motor generator (MG1)
Nmg1: rotation speed of first motor generator (MG1)
Img2: inertia of second motor generator (MG2)
Nmg2: rotation speed of second motor generator (MG2)

Furthermore, Ne is used for the calculation while being set to zero (0) rpm when the engine is stopped and is set to, for example, 1000 rpm when the engine is operated.

Figure 6:
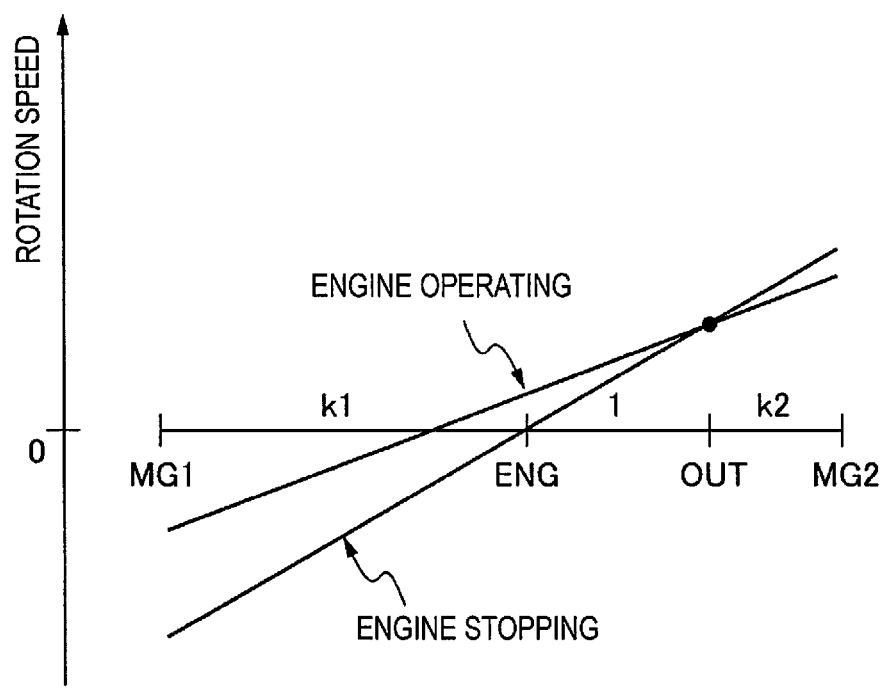
FIG. 6 is a diagram illustrating a relation of rotation speeds of respective rotation components of an engine (ENG), a first motor generator (MG1), a second motor generator (MG2), and a drive shaft (OUT) (embodiment).

Furthermore, FIG. 6 illustrates a relation of the rotation speeds of respective rotation components of the engine (ENG) 2, the first motor generator (MG1) 4, the second motor generator (MG2) 5, and the drive shaft (OUT) 8.

In FIG. 6,
k1: lever ratio of first motor generator (MG1)-engine (ENG) in case of "1" of engine (ENG)-drive shaft (OUT)
k2: lever ratio of drive shaft (OUT)-second motor generator (MG2) in case of "1" of engine (ENG)-drive shaft (OUT)

Further, the power which is consumed by the engine 2 from the operational state to the stopped state is obtained based on FIG. 7 from the calculation results of the above-described equation (Equation 1) and the following equation (Equation 2).

$$P = (E1 - E2)/s \quad \text{(Equation 2)}$$

In (Equation 2),
P: power consumed by engine from operational state to stopped state
E1: motion energy of engine and motor generator in case of stopped state of engine calculated from equation (Equation 1) above
E2: motion energy of engine and motor generator in case of operational state of engine calculated from equation (Equation 1) above s: time necessary for engine changing from operational state to stopped state Furthermore, s is used as, for example, 1 s for the calculation.

Then, the case where the calculation result of Equation (2) is plus (+) indicates a state where power is consumed for the engine from the operational state to the stopped state, and the engine stop permission vehicle speed in which the value does not exceed the engine stop use permission power is set in FIG. 4 as the engine stop permission vehicle speed search map M2.

Specifically, as illustrated in FIG. 7, for example, at the point of A [W] of the engine stop use permission power, the vehicle speed B [kph] at A [W] or a value equal to or less than B [kph] is set in FIG. 4 as the engine stop permission vehicle speed search map M2.

Figure 8:
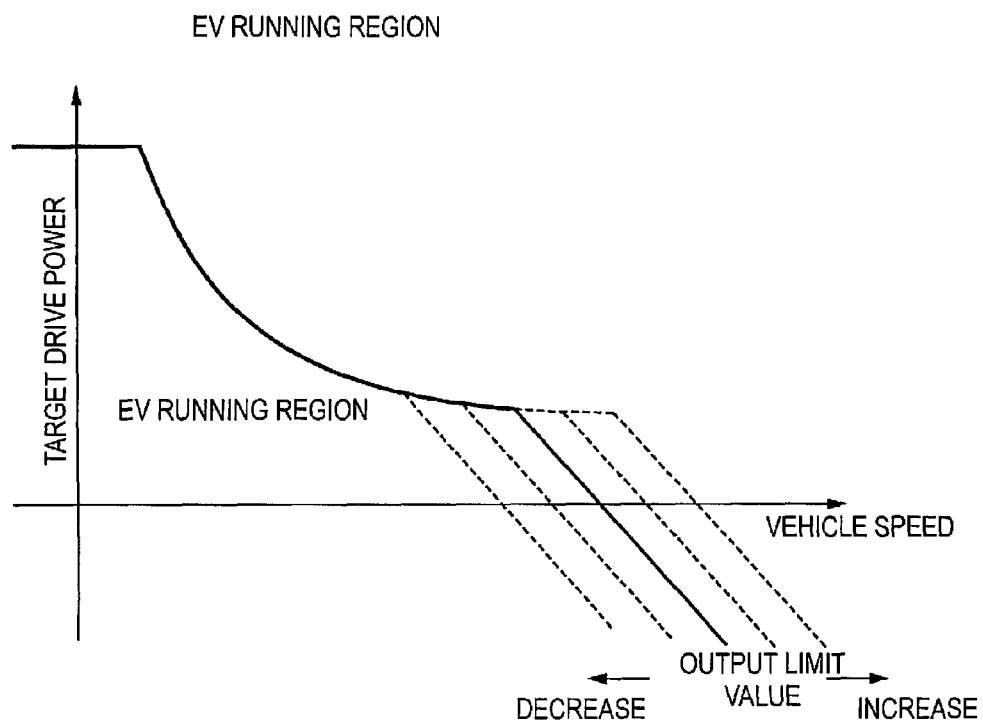
FIG. 8 is a diagram illustrating an EV (electric vehicle) running region (embodiment).

In addition, the EV (electric vehicle) running region when using the control according to the embodiment changes in response to the output limit value as illustrated in FIG. 8.

That is, in the embodiment, the target drive power is set from the accelerator opening degree and the vehicle speed. Then, the target drive power is calculated from the target drive power and the vehicle speed, a result obtained by subtracting the target drive power from the output limit value of the battery 18 is set as the engine stop use permission power, and the engine stop permission vehicle speed is set in response to the engine stop use permission power. When the vehicle speed is larger than the engine stop permission vehicle speed, the stopping of the engine based on the vehicle speed is prohibited. Meanwhile, when the vehicle speed is smaller than the engine stop permission vehicle speed, the stopping of the engine based on the vehicle speed is permitted. Further, the operation/stopping of the engine 2 is determined from the engine stop determination result based on the vehicle speed and the engine stop determination result based on the other conditions. Further, the engine stop permission vehicle speed is set to the vehicle speed in which the power consumed by the engine 2 from the operational state to the stopped state does not exceed the result obtained by subtracting the target drive power from the output limit value.

Next, the control of the embodiment will be described based on the flowchart of FIG. 2.

Figure 2:
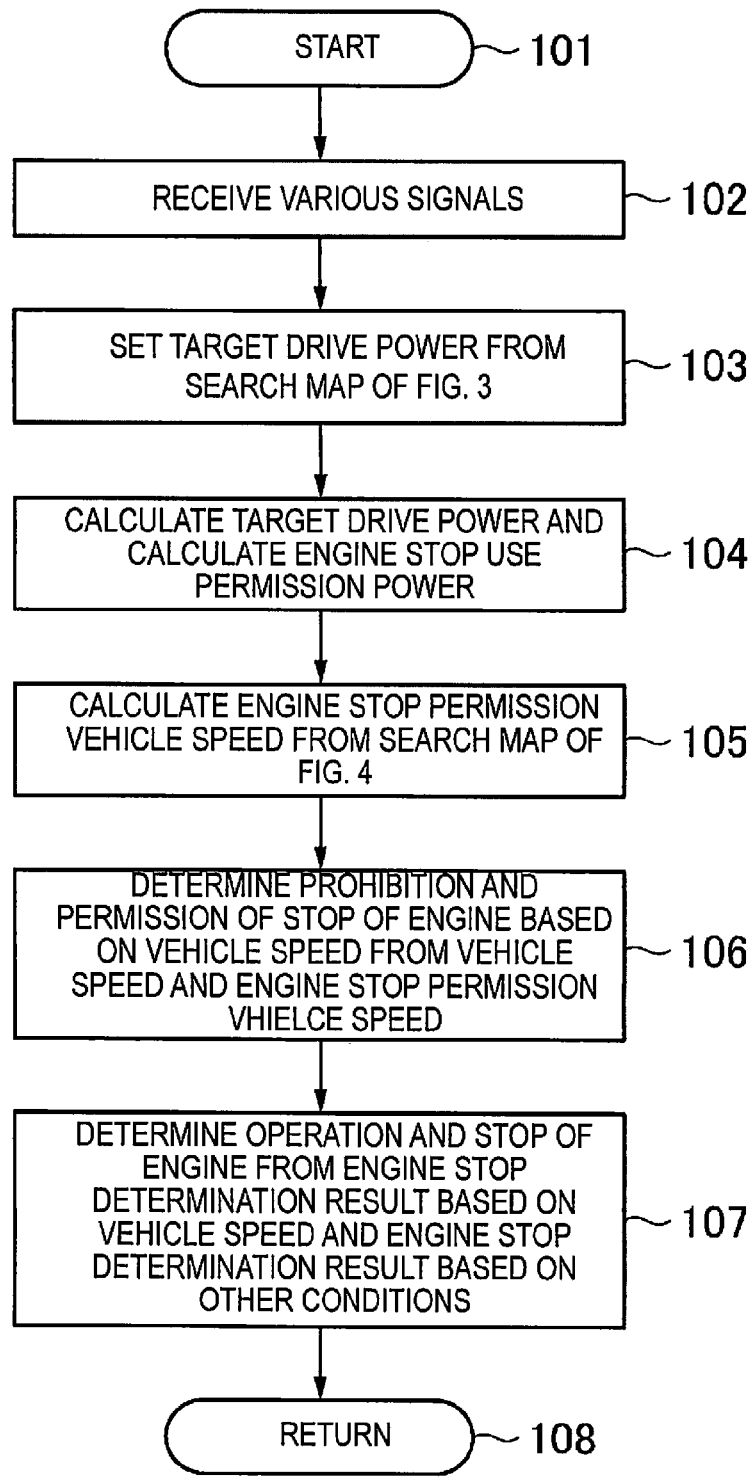
FIG. 2 is a flowchart that determines an operation and a stopping of an engine (embodiment).

The routine in FIG. 2 is periodically executed.

As illustrated in FIG. 2, when the program of the control means 17 is started (step 101), various signals of the output limit value of the battery 18 set by the output limiting means 17B, the accelerator opening degree, and the vehicle speed are first received (step 102). Then, the target drive power obtained in response to the accelerator opening degree and the vehicle speed is set from the target drive power search map M1 of FIG. 3 (step 103).

Then, the target drive power is calculated from the set target drive power and the detected vehicle speed, and the engine stop use permission power is calculated by subtracting the target drive power from the output limit value of the battery 18 (the output limit value—the target drive power) (step 104).

Further, the engine stop use permission power is determined from the engine stop permission vehicle speed search map M2 of FIG. 4, and the engine stop permission vehicle speed obtained in response to the determined engine stop use permission power is calculated (step 105).

Then, the prohibition and the permission of the stopping of the engine based on the vehicle speed are determined from the detected vehicle speed and the calculated engine stop permission vehicle speed (step 106). That is, when the vehicle speed is larger than the engine stop permission vehicle speed, the stopping of the engine based on the vehicle speed is prohibited. Meanwhile, when the vehicle speed is smaller than the engine stop permission vehicle speed, the stopping of the engine based on the vehicle speed is permitted.

Subsequently, the operation and the stopping of the engine 2 are determined from the engine stop determination result based on the vehicle speed and the engine stop determination result based on other conditions such as the vehicle drive power and the charge state (SOC) of the battery 18 (step 107), and the program returns (step 108).

While the embodiment of the invention has been described above, the configuration of the embodiment will now be described.

First, in the invention (1), the control means 17 includes the target drive power setting means 17A which sets the target drive power requested for the running of the vehicle, the target drive power calculating means 17B which calculates the target drive power from the target drive power set by the target drive power setting means 17A and the vehicle speed detected by the vehicle speed detecting means 33, the output limiting means 17C which limits the amount of power obtained from the battery 18 based on the state of the battery 18, and the transition prohibiting means 17D which prohibits the transition to the stopped state of the engine 2 when the power consumed for the transition of the engine 2 from the operational state to the stopped state exceeds a value obtained by subtracting the target drive power calculated by the target drive power setting means 17B from the output limit value set by the output limiting means 17C.

Accordingly, since the transition of the engine 2 from the operational state to the stopped state is managed based on the state of the battery 18, no adverse influence (overdischarge or the like) is given to the lifetime of the battery 18, and hence degradation of the battery 18 may be suppressed.

Further, in the invention (2), the control means 17 sets the power which is consumed by the transition from the operational state of the engine 2 to the stopped state of the engine 2 and is used for the determination of the transition prohibiting means 17D so that a higher value is set as the vehicle speed detected by the vehicle speed detecting means 33 becomes higher.

Accordingly, since there is no need to use a particular determination in the execution of the transition prohibiting means 17D, the prohibition of the transition may be performed without any delay. Accordingly, since the charge and discharge state of the battery 18 may be accurately managed, the lifetime of the battery 18 may be extended.

INDUSTRIAL APPLICABILITY

The hybrid vehicle control device according to the invention may be applied to various electric vehicles such as an electric automobile.

REFERENCE SIGNS LIST 1 hybrid vehicle control device
2 engine (ENG)
4 first motor generator (MG1)
5 second motor generator (MG2)
6 drive wheel
8 drive shaft (OUT)
9 power transmitting mechanism
15 first inverter
16 second inverter
17 control means
17a target drive power setting means
17b target drive power calculating means
17c output limiting means
17d transition prohibiting means
18 battery (electricity storing means)
32 accelerator opening degree detecting means
33 vehicle speed detecting means
34 battery charge state detecting means
35 engine rotation speed detecting means

The invention claimed is:

1. A hybrid vehicle which outputs power generated by an engine and a motor generator to a drive shaft through a power transmitting mechanism, the hybrid vehicle comprising:
   a battery for exchanging power with the motor generator;
   a vehicle speed sensor for detecting a vehicle speed; and
   a control unit which includes a target drive power setting unit to set target drive power requested for running of the hybrid vehicle, a target drive power calculating unit to calculate target drive power from the target drive power set by the target drive power setting unit and the vehicle speed detected by the vehicle speed sensor, an output limiting unit to set an output limiting value for limiting the amount of power obtained from the battery based on the state of the battery, and a transition prohibiting unit to calculate engine stop use permission power based on a value obtained by subtracting the target drive power, calculated by the target drive power calculating unit, from the output limit value set by the output limiting unit and prohibits a transition of the engine from an operational state to a stopped state when the vehicle speed detected by the vehicle speed sensor exceeds an engine stop permission vehicle speed corresponding to the engine stop use permission power based on an engine stop permission vehicle speed search map.

2. The hybrid vehicle according to claim 1, wherein the engine stop permission vehicle speed is set in the control unit based on the engine stop permission vehicle speed search map that shows the relationship between power consumed by the transition of the engine from the operational state to the stopped state and the vehicle speed detected by the vehicle speed sensor.

* * * * *